(12) United States Patent
Okamura et al.

(10) Patent No.: US 6,994,287 B2
(45) Date of Patent: *Feb. 7, 2006

(54) TAPE CARTRIDGE

(75) Inventors: Masatoshi Okamura, Tokyo (JP); Hiroshi Kaneda, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/444,292

(22) Filed: May 23, 2003

(65) Prior Publication Data

US 2004/0041050 A1      Mar. 4, 2004

Related U.S. Application Data

(63) Continuation of application No. 09/650,051, filed on Aug. 29, 2000, now abandoned.

(30) Foreign Application Priority Data

Jul. 9, 1999 (JP) .................................. 11-252773
Jul. 12, 2000 (JP) .............................. 2000-211233

(51) Int. Cl.
*G11B 23/07*      (2006.01)

(52) U.S. Cl. .................................. 242/348.2; 360/132
(58) Field of Classification Search ............ 242/332.4, 242/348.2; 360/132
See application file for complete search history.

(56) References Cited

U.S. PATENT DOCUMENTS

| 5,927,633 | A | 7/1999 | McAllister |
| 5,971,310 | A | 10/1999 | Saliba et al. |
| 6,450,432 | B1 * | 9/2002 | Kaneda et al. ........... 242/332.4 |

FOREIGN PATENT DOCUMENTS

| EP | 0 924 703 A1 | 6/1999 |
| EP | 0 932 155 A2 | 7/1999 |
| JP | 10-149661 | 6/1998 |
| WO | WO 98/44499 A1 | 10/1998 |
| WO | WO 99/52107 A1 | 10/1999 |

* cited by examiner

*Primary Examiner*—John Q. Nguyen
(74) *Attorney, Agent, or Firm*—Akin Gump Strauss Hauer & Feld, LLP

(57)      ABSTRACT

The invention is a tape cartridge including a single tape reel around which a length of magnetic tape is wound and which is turnably held within a housing. The beginning of the tape is fixed to a leader so that it can be drawn out through an opening formed in the housing by a tape drawing-out member of a recorder which has an end capable of engaging the tape end. The leader includes a metallic center pin member on which the beginning of the tape is wound and a pair of engaging members of synthetic resin joined to upper and lower ends of said pin member so as to engage the tape drawing-out member of the recorder. The engaging members are molded together integrally with the upper and lower ends of the pin member.

4 Claims, 8 Drawing Sheets

Elements Shown in Broken Lines are of a Non-Circular or Irregular Cross Section (a)  (b)  (c)

(a)

(b)

TAPE CARTRIDGE

CROSS-REFERENCE TO RELATED APPLICATIONS

This application is a continuation of prior application Ser. No. 09/650,051, filed Aug. 29, 2000.

BACKGROUND OF THE INVENTION

This invention relates to a single-reel type tape cartridge for use with magnetic recording-reproducing apparatus and, more particularly, to improvements in the tape leader of a tape cartridge of the character.

Single-reel type tape cartridges are extensively used in computer backup and other data storage applications for safekeeping. With a tape cartridge of the type, a leader tape or leader member attached to the outer end of a magnetic tape is drawn out by a drawing-out member provided in a magnetic recording-reproducing apparatus (hereinafter referred to as a "recorder") or drive, the tape is led through passages in the recorder, and the tape end is fixed to the hub of another reel resident in the recorder. Upon conclusion of recording or playback operation the tape is driven backward and withdrawn into the cartridge, until the leader tape is reset in the original position in the cartridge.

Typical leader members for conventional single-reel type tape cartridges include one (disclosed, e.g., in Japanese Patent Application Kokai No. 58-169380) which comprises a pin, block, etc. secured to a tape end to be caught by a tape drawing-out member of a recorder. Another type uses a leader tape of relatively tough, elastic material which is connected to a magnetic tape end and has a hole at its own outer end adapted to be engaged with a corresponding hook of a drawing-out member of a recorder which too is formed of a relatively tough, elastic material (Japanese Patent Application Kokai No. 62-502641)

FIG. 4 is an exploded view of a conventional single-reel type cartridge 103 using the technique disclosed in the above-mentioned Patent Application Kokai No. 62-502641. A housing of the cartridge composed of an upper half casing 101 and a lower half casing 102 is shown containing a single tape reel 107 which has an upper flange 104 and a lower flange 105, the tape reel 107 being normally biased toward the lower casing 102 by a compression spring 108. A leader tape 109 is spliced to the outer end of a length of magnetic tape 106 wound round a hub (not shown) of the upper flange 104 of the tape reel 107. The tape reel 107 has a bearing (not shown) on a ring which is press fitted in an annular recess (not shown) formed in the center of the upper flange 104. With a reel shaft (not shown) fitted in the bearing, the reel can revolve around the shaft. The upper flange 104 of the tape reel 107 has a serration 114 formed along its circumference. On the other hand, a pair of brake members 112, 113 are provided on the inner surface 101a of the upper casing 101 and are normally biased toward the serration 114 by torsion coil springs 110, 111, with cogs 115, 116, respectively, of the brake members 112, 113 in mesh with the serration 114 to keep the tape reel from revolution when the cartridge is not in use. When the cartridge is on standby the magnetic tape 106 is fully wound up on the tape reel 107, and an engaging hole formed at the end of the leader tape 109 is engaged with a hook 117 located close to a side wall of the cartridge housing 103. An opening 120 through which the magnetic tape 106 is drawn out from the cartridge housing 103 is normally closed by a lid 118 which is openable with respect to the cartridge housing.

As the cartridge is loaded into a recorder for use, the brake members 112, 113 are automatically set free and the tape reel 107 is lifted against the urging of the compression spring 108 to a position free to turn. At the same time, the lid 118 is opened by means provided for that purpose in the recorder.

The tape drawing-out member on the part of the recorder then enters the housing through the opening to be engaged with the hole of the leader tape 109 and draws out the magnetic tape together with the leader tape 109 in the manner described above, so that the tape is threaded in the route within the recorder.

The leader tape 109 is made using a thick spring sheet of tough synthetic resin such as polyethylene terephthalate (PET). As FIG. 5A indicates, a hole 120 is formed at the end of the tape so as to be engaged with a tab 121 (serving as a hook) formed at the end of a tape drawing-out member 122 of the recorder. The hole 120 has an angular cutout 123 to ensure positive engagement with the tab 121, with a neck of the drawing-out member that supports the tab 121 fitted in the cutout. FIGS. 5A–5C shows a sequence of the stages (a), (b), and (c) in which the drawing-out member 122 that gains entrance into the cartridge is progressively engaged with the leader tape 109.

The tape drawing-out mechanisms of the prior art present the following problems. The tape drawing-out member 122 of the recorder, as shown in FIG. 5A, is in the form of a tape connected to a reel provided in the recorder, with the tape end having the tab 121 adapted to be engaged with the hole 120 of the leader tape in the tape cartridge. Since the end portions of the leader tape and the drawing-out member 122 of the recorder are both tape-shaped, they are susceptible to curling. When the both curl, the tape drawing-out member 122 of the recorder becomes sometimes unable to engage the leader tape 109 of the cartridge loaded in the recorder.

On the other hand, direct coupling of the end of a magnetic tape to a tough leader member without the aid of a leader tape would stabilize the actions of drawing out and drawing in of the magnetic tape. Nevertheless, a somewhat complex structure of the leader member, unlike a PET one, involves difficulties in assembling during the course of cartridge manufacture. Such a leader member has an additional problem. As illustrated in FIG. 2, it comprises a center pin member 91 in the form of a pin on which a tape end is wound and secured in place by clamping, and a pair of engaging members 92-1, 92-2 fixed at one ends, respectively, to the upper and lower ends of the pin member. On the sides of the engaging members 92-1, 92-2 facing each other, there are formed engaging recesses 94-1, 94-2 in mirror symmetry adapted to engage a pin or hook of a drawing-out member of a recorder. The center pin member 91 is made of metal and is securely fitted at both ends in blind holes formed at one ends of the engaging members 92-1, 92-2 both made of plastic.

In the arrangement shown, when uneven forces are applied to the portions of the engaging members 92-1, 92-2 connected to the center pin member 91, the pin member can sometimes turn within the blind holes and hamper positive action of the leader. The present invention is aimed at providing a stabilized, solid leader of a structure enhanced in dimensional accuracy and which lends itself to more simplified manufacturing process than heretofore.

BRIEF SUMMARY OF THE INVENTION

The tape cartridge according to the present invention is one including a single tape reel around which a length of magnetic tape is wound and which is turnably held within a housing, the beginning of the tape being fixed to a leader so that it can be drawn out through an opening formed in the housing by a tape drawing-out member of a recorder which has an end capable of engaging the tape end, characterized in that the leader comprises a center pin member on which the beginning of the tape is wound and a pair of engaging members of synthetic resin joined to the upper and lower ends of said pin member so as to engage the tape drawing-out member of the recorder and that the center pin and engaging members are molded in one piece.

In an embodiment of the invention the engaging members are elongated tabs formed with engaging recesses on opposing faces to be engaged with a drawing-out member of a recorder.

In preferred embodiments the center pin and engaging members are integrally molded together from a material chosen from among synthetic resins such as polyacetal resin (POM), polyamide (PA), and polycarbonate (PC), with or without the addition of a reinforcing material such as glass fiber, metal, or metal oxide, or the center pin member is in the form of a metallic solid pin having both ends of irregular profile other than circle, all formed in one piece at the time of synthetic resin molding.

DETAILED DESCRIPTION OF THE INVENTION

The present invention will be described in detail below in conjunction with a few preferred embodiments thereof.

Figure 1:
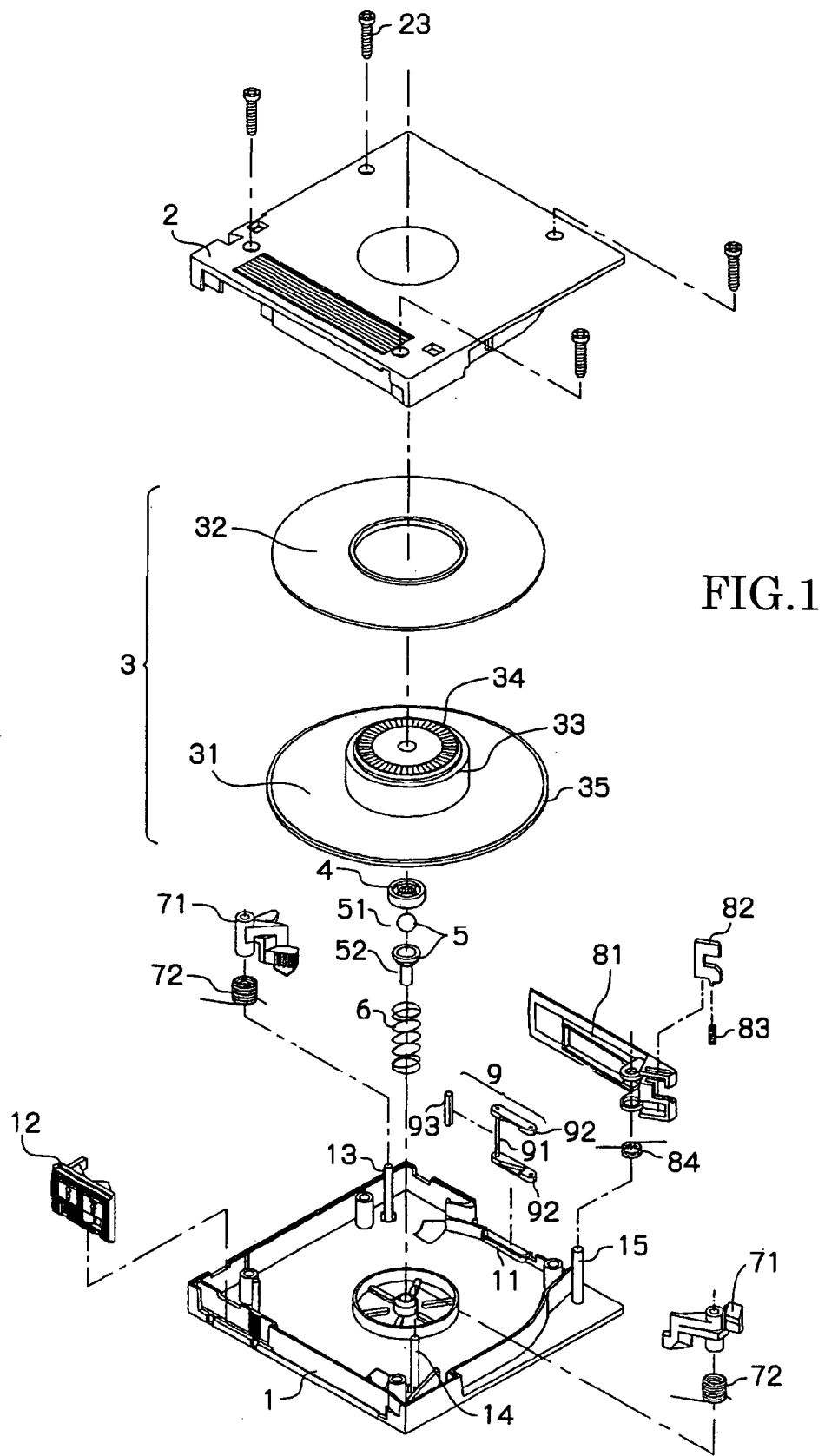
FIG. 1 is an exploded view of a tape cartridge embodying the present invention.
Figure 2:
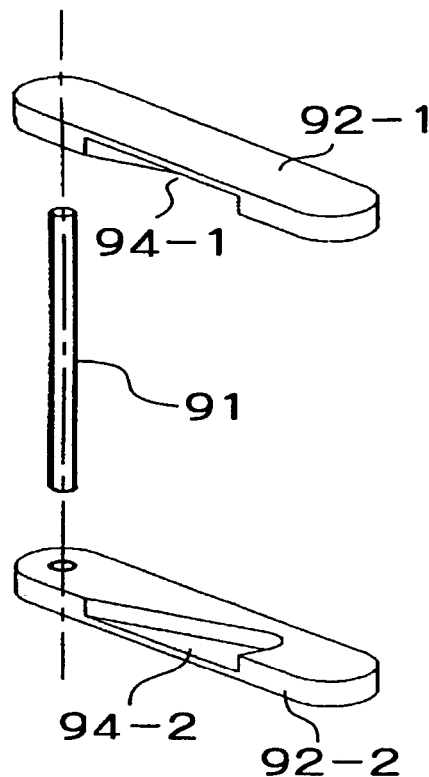
FIG. 2 is an exploded view of a leader, explanatory of the problem that the leader presents.
Figure 3:
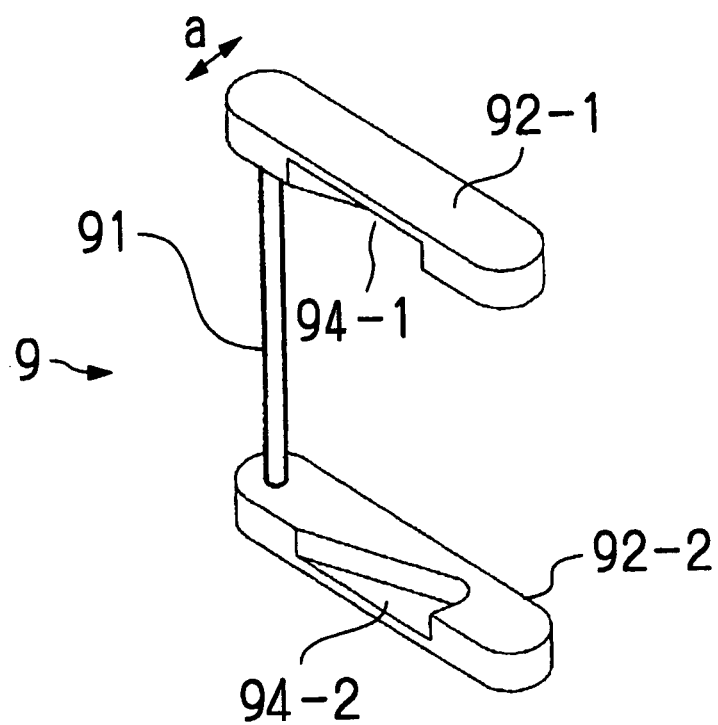
FIG. 3 is a perspective view of a leader embodying the invention.

FIG. 1 is an exploded view of a tape cartridge embodying the invention, and FIG. 3 is a detailed view, in perspective, of a leader.

Figure 4:
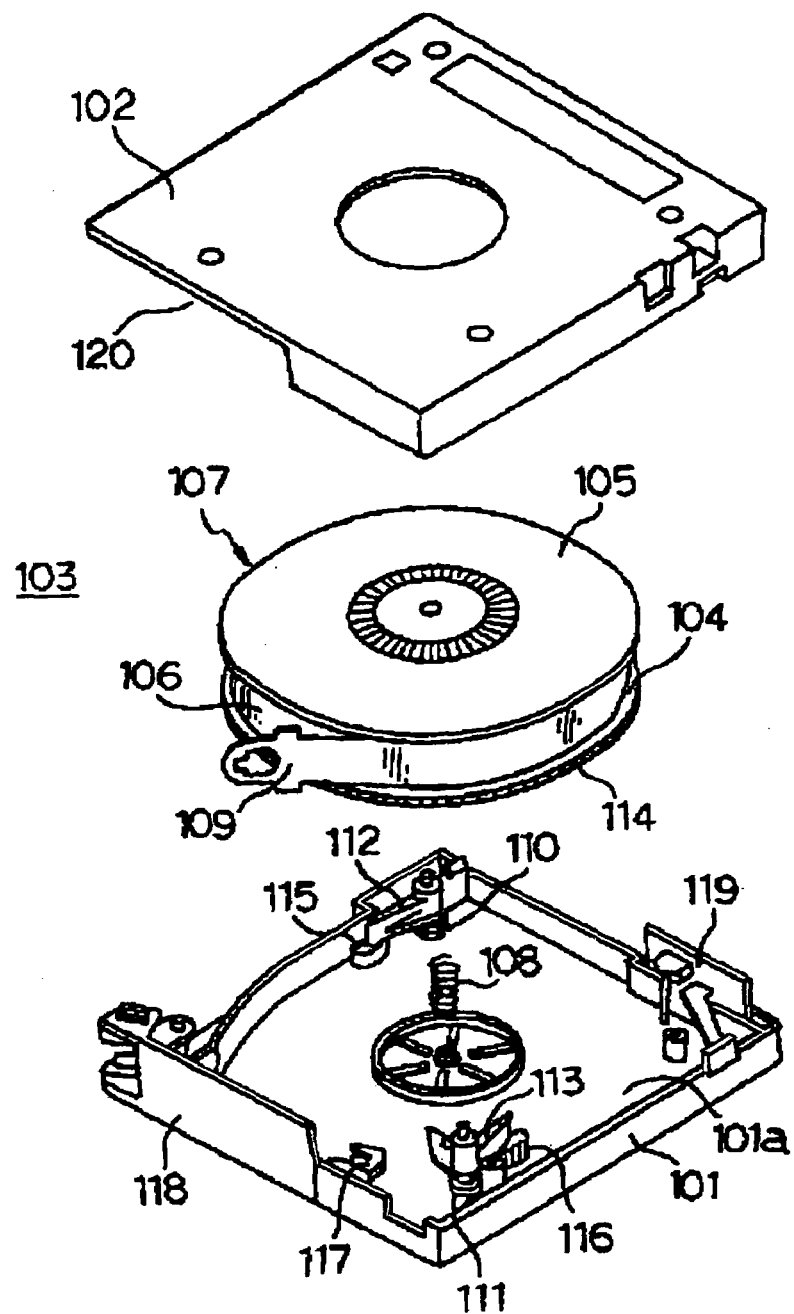
FIG. 4 is an exploded view of a conventional tape cartridge.
Figure 5:
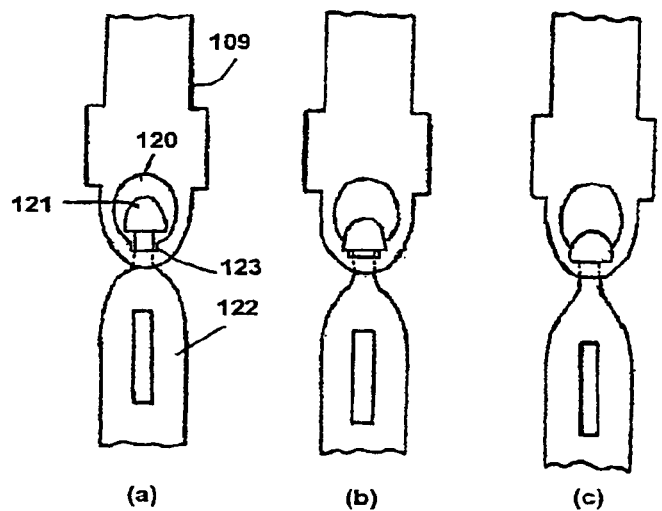
FIGS. 5A, 5B and 5C shows how a conventional leader and tape drawing-out member come in engagement.
Figure 5:
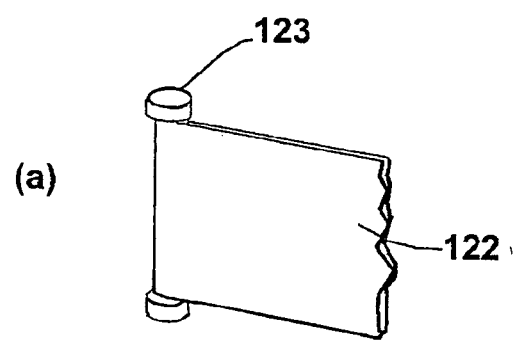

Referring to FIG. 1, a tape cartridge according to the invention is shown upside down. It illustrates how the parts look in actual assembling operation. A complete cartridge is loaded, in the regular unreversed posture, in a recorder. The cartridge is similar in construction to the cartridge shown in FIG. 4 excepting the leader and associated parts.

An upper casing 1 and a lower casing 2 are joined along edges using setscrews 23 to form a cartridge housing. A reel 3 on which a length of magnetic tape is wound is accommodated in the space inside the housing composed of the upper and lower casings.

The reel 3 consists of an upper flange 31, a hub 33 formed in one piece with the upper flange, and a lower flange 32. The underside of the hub 33 inward of the core on which the tape is wound is closed and is provided with an annular toothed part 34 adapted to mesh with drives of a recorder. The upper side of the hub 33 constitutes an open recess which contains a rotational reel support 5 composed of a bearing 4 that smoothens the rotation of the reel, a ball 51 in contact with the bearing 4, and a support member 52 recessed at top to receive the ball. The upper end of the support member 52 is received by a blind hole in the upper casing 1, and a coiled compression spring 6 loosely fitted around the support member constantly urges the bearing 4 and the rotational reel support 5 toward the reel.

An irregular surface 35 is formed along the circumference of the upper flange 31, and there are provided two brake mechanisms each composed of one of a pair of pins 13, 14 held upright on two diagonal corners inside the housing, a coiled torsion spring 72, and a brake member 71 with bore, the spring and brake member being fitted on the pin. When the cartridge is not in use, the two brake mechanisms coact to engage the brake members 71 with the irregular surface 35 on the circumference of the upper flange 31 so as to keep the reel from unwanted rotation.

Figure 7:
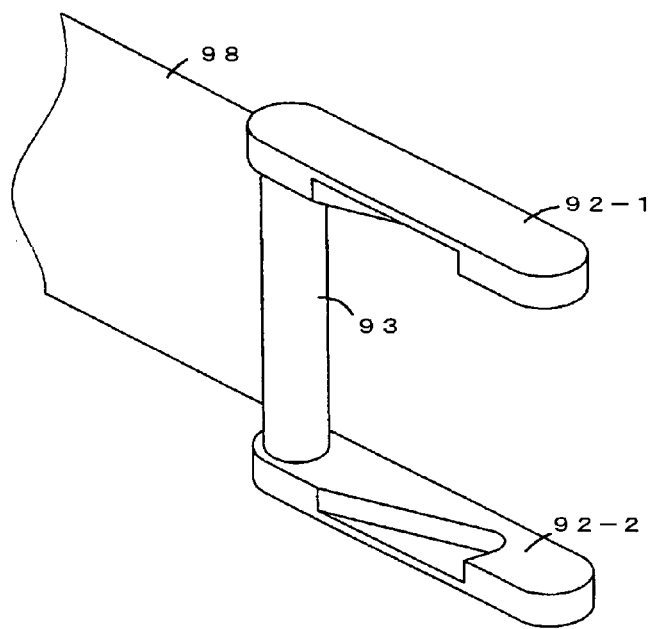
FIG. 7 is a perspective view of a leader according to the invention as connected with a leader tape, the tape end being fixed to the center pin of the leader with a clamp.

The outer end of the tape is fixed to a leader 9. The leader 9 is made up of a center pin 91, a pair of engaging members 92 fixed at one ends, respectively, to the upper and lower ends of the pin member, and a clamp 93 for clamping the tape end to the pin 91. The tape end is wound round the center pin 91 and is secured in place with the clamp 93 fitted onto it. The leader 9 is housed in a recess 11 formed near the inner surface of an opening formed on one side of the housing. The clamp 93 is fitted onto the center pin 91, as shown in FIG. 7, from the direction in which the engaging members 92 extend.

Figure 8:
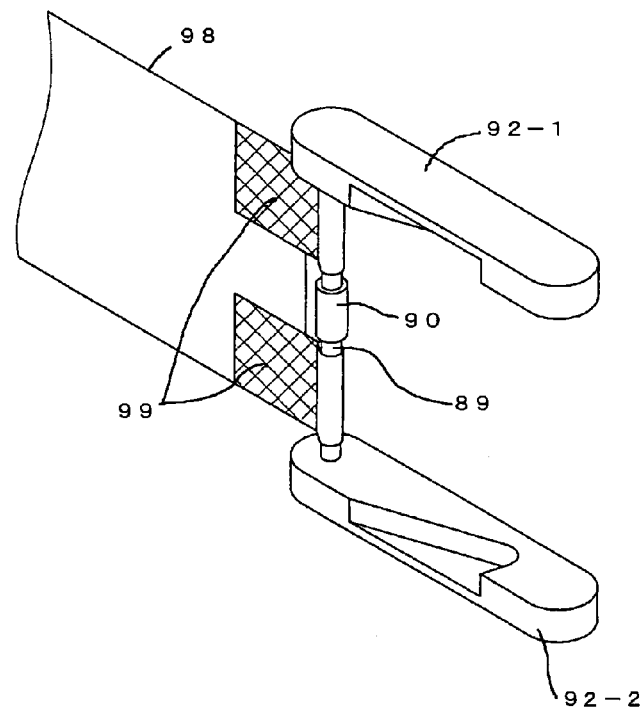
FIG. 8 is a perspective view of a leader of the clamp-free type according to the invention as connected with a tape.
Figure 9:
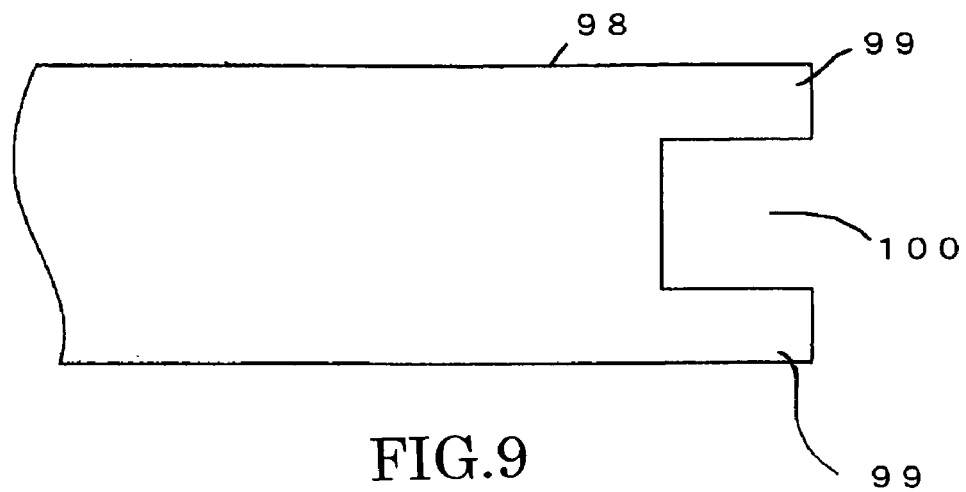
FIG. 9 is a schematic view of the end portion of the leader tape shown in FIG. 8.
Figure 10:
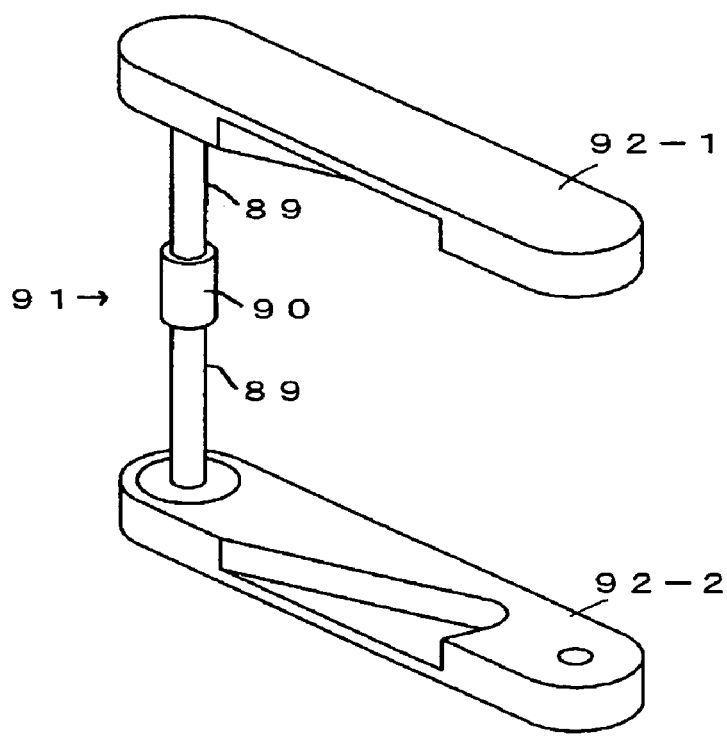
FIG. 10 is a perspective view of the leader shown in FIG. 8.

As another embodiment of the invention an arrangement may be made so that a leader tape can be fixed to the center pin without the aid of the clamp. FIG. 8 illustrates the embodiment in which a leader tape 98 has a center cutout 100 at the outer end, as shown in FIG. 9, leaving two extended end portions 99, which are to be wound round and fixed to the center pin. On the other hand, as FIG. 10 shows, the center pin 91 has two small-diameter portions 89 on which the end portions 99 of the leader tape are to be wound and a large-diameter portion 90 in between which prevents extreme deviation of the leader tape. As FIG. 8 indicates, the extended end portions 99 of the leader tape 8 are wound round the small-diameter portions 89 of the pin and their superposed layers are joined by ultrasonic welding or other technique to fix them to the pin 91.

The embodiments of the invention to be described later may incorporate leaders of either type, using a clamp or not.

On the outer side of the leader is fitted a turnable door member 81. The door member 81 is pivotally supported by a pin 15 of the upper casing 1 and is constantly biased to the closing direction by a torsion coil spring 84 fitted around the pin 15, and when the cartridge is not in use, it is locked by a door lock member 82 which, in turn, is under downward urging by a compression spring 83. A record defeat member 12 is held in a part of one side of the housing, slidably along that side.

FIG. 3 illustrates the construction of the leader 9 embodying the present invention. The upper and lower engaging members 92-1, 92-2 are elongated tabs of synthetic resin rounded at both ends and arranged in mirror symmetry. They are integrally fixed to the both ends of the center pin 91 that consists of a solid pin of synthetic resin on which magnetic tape end is wound and clamped. The opposing faces of the engaging members 92-1, 92-2 are formed with engaging recesses generally right-triangle-shaped engaging recesses 94-1, 94-2 cut out from one side in a mirror symmetric pattern. These engaging recesses are adapted to be engaged with a front-end pin or hook of a drawing-out member of a recorder as shown in FIGS. 6A and 6B.

Figure 3A:
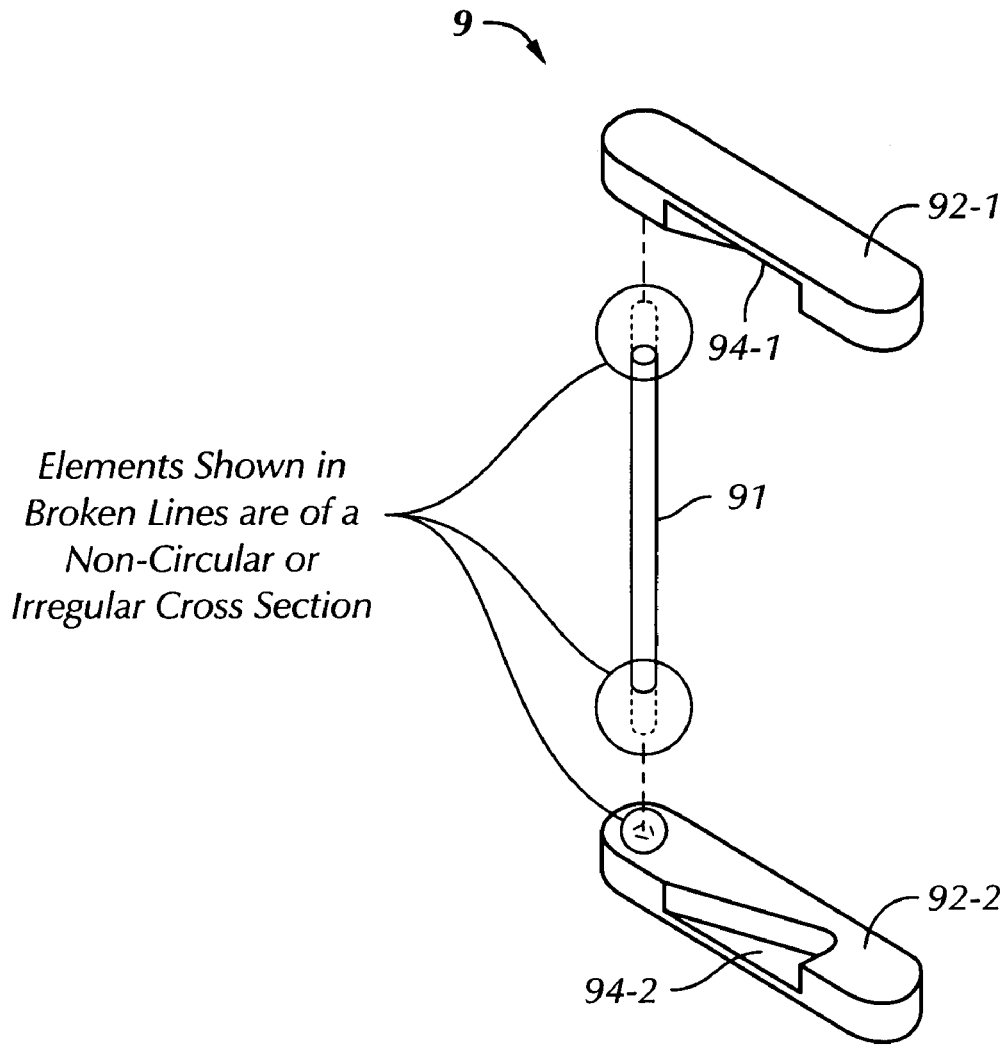
FIG. 3A is an exploded perspective view of a leader having a center pin in accordance with the present invention.
Figure 3B:
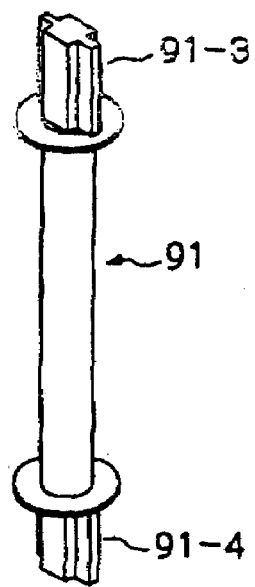
FIG. 3B is a perspective view of a second embodiment of a center pin in accordance with the present invention.
Figure 3C:
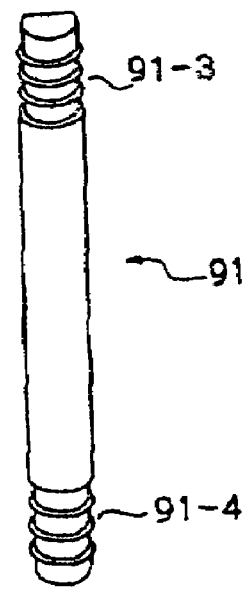
FIG. 3C is a perspective view of a third embodiment of a center pin in accordance with the present invention.

With reference to FIG. 3A, the center pin 91 may be provided with ends of various non-circular or irregular cross-sections.

Figure 6:
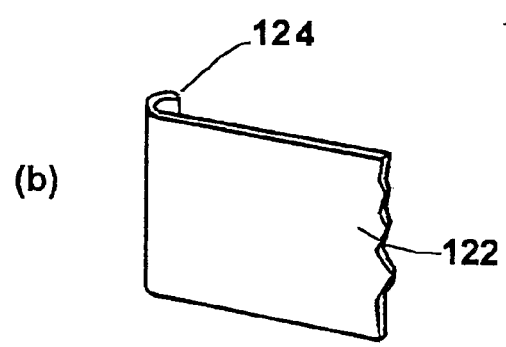
FIGS. 6A and 6B shows, in perspective, fragments of tape drawing-out members useful with leaders according to the invention.

FIGS. 6A and 6B illustrate examples of drawing-out member 122. In FIG. 6A is shown a member as a strip of PET or other synthetic resin spring material having a stop pin 123 at the free end. In FIG. 6B a member as a strip of PET or other synthetic resin spring material is bent at the end as a permanently deformed hook 124. Accordingly, the engaging recesses 94 are contoured in conformity with the configuration of the drawing-out member of the recorder, and the walls of the recesses are tapered to facilitate the engagement.

The center pin 91 and engaging members 92-1, 92-2 are formed of plastic in one piece. To realize this, the center pin 91 and engaging members 92-1, 92-2 are molded together from a material chosen from among synthetic resins such as POM, PA, and PC, with or without the addition of a reinforcing material such as glass fiber, metal, or metal oxide. The integral molding precludes the possibility of these members being distorted in the directions indicated by arrows a in FIG. 3.

FIG. 10 shows a leader of the clamp-free type integrally molded in the same way as described above.

As has been described, the present invention provides a leader of good dimensional accuracy not easily deformable with external forces by integral molding of a center pin and two engaging members on both ends of the pin. The invention thus ensures the stability of leader action and reduces manufacturing cost through elimination of some steps in assembling component parts.

We claim:

1. A tape cartridge including a single tape reel around which a length of magnetic tape is wound and which is turnably held within a housing, a beginning of the tape being fixed to a leader so that it can be drawn out through an opening formed in the housing by a tape drawing-out member of a recorder which has an end capable of engaging the tape end, said leader comprising a metallic center pin member on which the beginning of the tape is wound and a pair of engaging members of synthetic resin joined to upper and lower ends of said pin member so as to engage the tape drawing-out member of the recorder, wherein the engaging members are molded together integrally with the upper and lower ends of said pin member, said upper and lower ends having a non-circular cross-section.

2. The tape cartridge of claim 1, wherein said non-circular cross-section of the upper and lower ends of said pin member is an irregular cross-section.

3. The tape cartridge of claim 1, wherein the pair of engaging members are elongated tabs formed with engaging recesses in a mirror symmetric pattern which are adapted to be engaged with the drawing-out member of the recorder.

4. The tape cartridge of claim 1, wherein the engaging members are molded from a material chosen from the group consisting of polyacetal resin, polyamide, polycarbonate, and polyacetal resin, polyamide, and polycarbonate with addition of a reinforcing material selected from glass fiber, metal and metal oxide.

* * * * *